D. F. WILLIAMS.
LAND ROLLER.
APPLICATION FILED JULY 19, 1910.

976,764.

Patented Nov. 22, 1910.
2 SHEETS—SHEET 1.

WITNESSES
Howard D. Orr.
H. F. Riley

Dennis F. Williams, INVENTOR,
BY
E. G. Siggers.
ATTORNEY

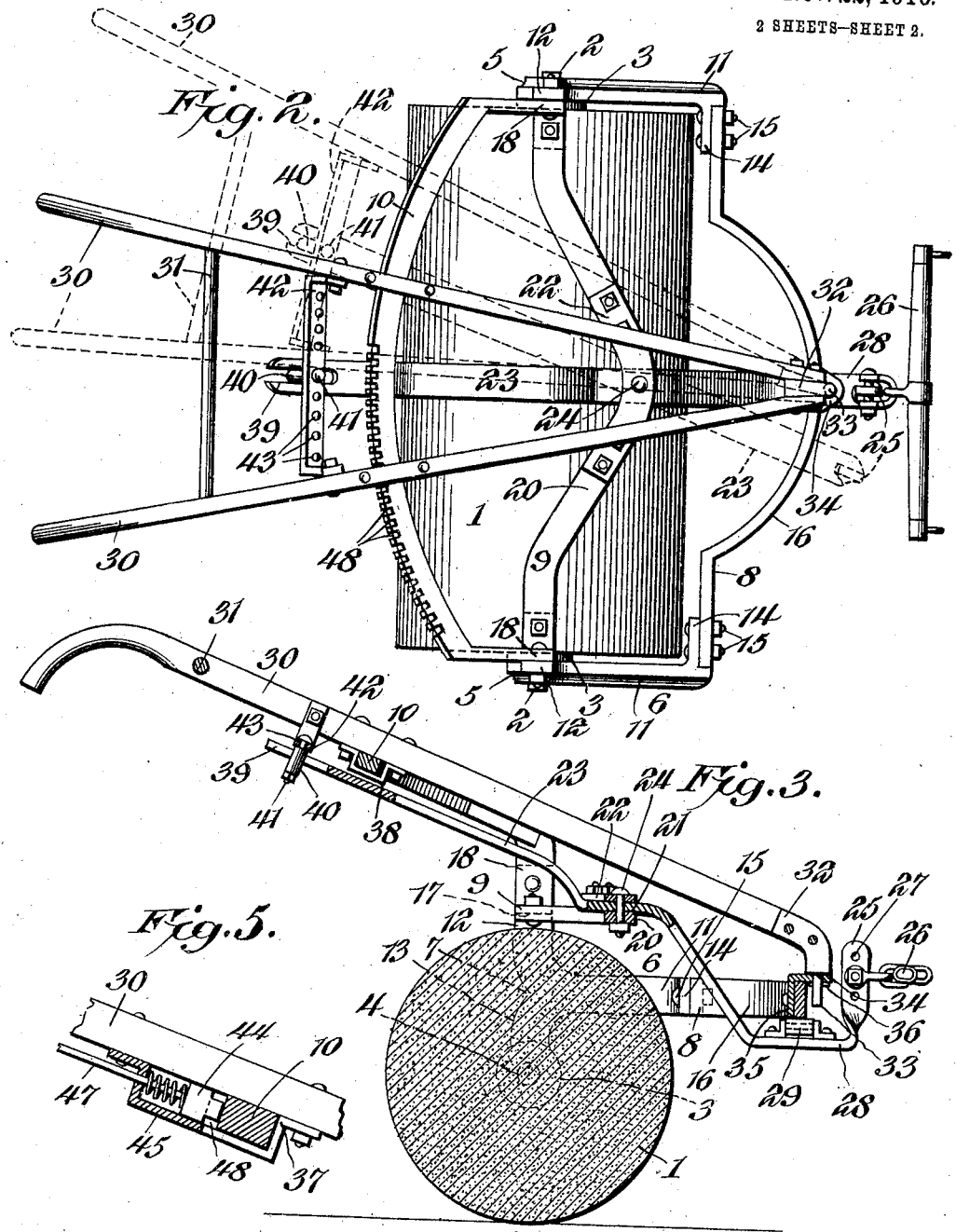

UNITED STATES PATENT OFFICE.

DENNIS F. WILLIAMS, OF FRUITVALE, TENNESSEE.

LAND-ROLLER.

976,764.  Specification of Letters Patent.  Patented Nov. 22, 1910.

Application filed July 19, 1910. Serial No. 572,782.

*To all whom it may concern:*

Be it known that I, DENNIS F. WILLIAMS, a citizen of the United States, residing at Fruitvale, in the county of Crockett and State of Tennessee, have invented a new and useful Land-Roller, of which the following is a specification.

The invention relates to improvements in land rollers.

The object of the present invention is to improve the construction of land rollers, and to provide a simple, efficient and comparatively inexpensive single horse land roller for use among growing crops to crush clods, pack the soil to retain moisture therein and to level the surface of the ground.

A further object of the invention is to provide a land roller of this character having an adjustably mounted roller, adapted to be arranged at an angle to the line of draft to cause it to run to and from the rows while the horse or other draft animal is traveling in the middle of the furrow.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
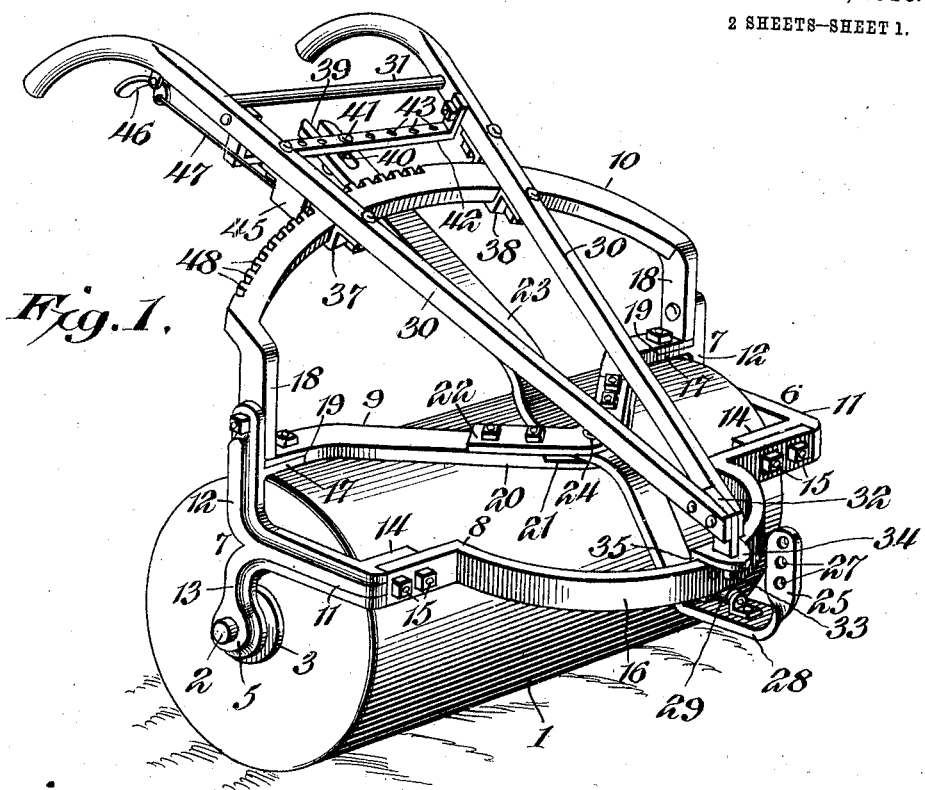
Figure 4:
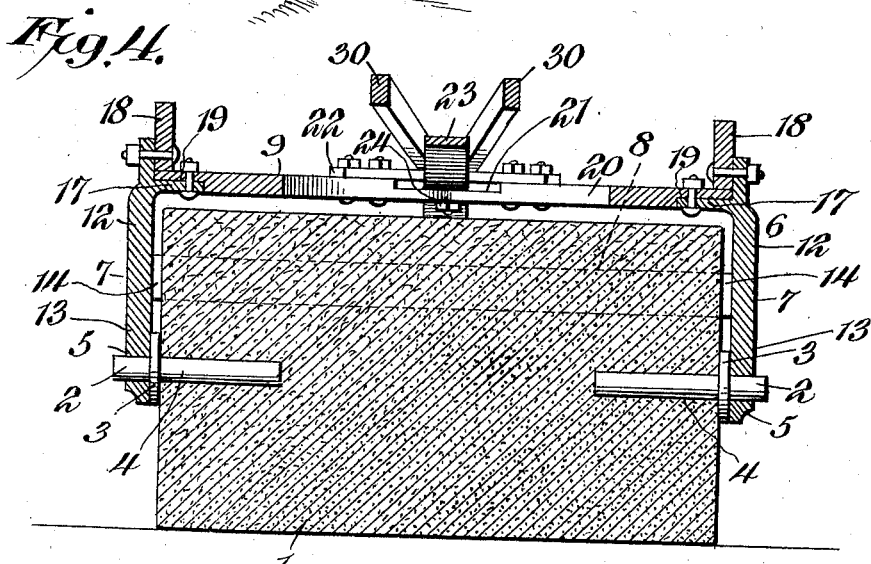

In the drawings:—Figure 1 is a perspective view of a land roller, constructed in accordance with this invention. Fig. 2 is a plan view of the same. Fig. 3 is a central longitudinal sectional view of the same. Fig. 4 is a transverse sectional view. Fig. 5 is a detail sectional view, illustrating the construction of the locking device for securing the handles and the draft beam in their adjustment with relation to the main frame.

Like numerals of reference designate corresponding parts in all the figures of the drawings.

1 designates a roller, preferably constructed of concrete, or other plastic material and equipped at its ends with projecting journals 2, provided with enlarged collars 3 and having integral shank portions 4 embedded in the roller, as clearly shown in Fig. 4 of the drawings. The journals are arranged in suitable bearings 5 of a main frame 6, and the collars 3, which fit against the ends of the roller, are interposed between the same and the side members 7 of the main frame to prevent the frame from wearing or breaking off portions of the concrete, or other material of which the roller may be constructed.

The main frame is composed of the said side members 7, a front connecting bar 8, an intermediate transverse connecting and supporting bar 9, and a rear elevated arcuate handle supporting bar 10. The intermediate supporting bar 9 is located above the plane of the front bar 8, and the rear supporting bar 10 is arranged above the plane of the intermediate supporting bar. The side members preferably consist of castings and are approximately T-shaped, being composed of forwardly extending arms 11 and upwardly and downwardly extending arms 12 and 13, the downwardly extending or depending arms being provided with bearings for the journals of the roller. The forwardly extending arms are provided with inwardly projecting attaching lugs 14, off-set from the front ends of the arms 11 to form recesses for the terminal portions of the front bar 8, which is secured by bolts 15, or other suitable fastening means to the attaching lugs. The front connecting bar is provided with an intermediate arcuate portion 16, and the upwardly extending arms 12 are provided at points intermediate of their ends with inwardly projecting horizontal attaching lugs or flanges 17 to which the ends of the central transverse bar 9 are secured. The arcuate bar 10 is provided at its ends with depending vertical arms or portions 18, fitted against the upper face of the connecting bar 9 and secured by bolts, or other suitable fastening devices to the upper portions of the arms 12. The ends of the transverse bar 9 are preferably provided at their lower faces with recesses 19 in which the attaching lugs or flanges 17 are fitted.

The transverse connecting bar is provided with an intermediate forwardly extending bend 20, curved at the center and provided in its upper face with a recess 21, which is covered by a curved plate or piece 22. The curved plate or piece 22 is bolted or otherwise secured at its ends to the bar 9 at the ends of the slot 21, and it is spaced from the bottom thereof to form a slot or opening for the reception of a metallic draft beam 23, connected intermediate of its ends to the central transverse bar of the frame at the center thereof by a vertical pivot 24, preferably consisting of a bolt and piercing the plate or piece and the bar 9, as clearly shown in Fig. 3 of the drawings. The front arm or portion of the draft beam is inclined downwardly and extended forwardly beneath the arcuate portion 16, and is provided with an integral upstanding arm 25, constituting a clevis for the attachment of a swingletree 26 and provided at intervals with perforations 27 to permit a vertical adjustment of the swingletree 26. The forwardly extending horizontal portion 28 of the beam is equipped with a horizontal anti-friction roller 29, mounted in suitable bearing brackets and arranged to run on the lower face of the arcuate portion of the front connecting bar, which is supported upon the front arm of the pivoted beam.

The rear arm or portion of the pivoted beam is inclined and is arranged in parallelism with a pair of handle bars 30, connected at their rear ends by a transverse rung 31 and secured at their front ends to a block or piece 32, having an integral depending pivot 33, mounted in a bearing opening of a plate 34, projecting forwardly from the upper edge of the center of the arcuate portion 16, and having a depending attaching portion 35, which is secured to the rear face of the front connecting bar of the main frame. The block or piece 32 and the pivot 33 preferably consist of a casting, and the pivot is retained in the opening of the bearing plate 34 by a pin or key 36.

The handle bars extend upwardly and rearwardly from the front of the frame and rest upon the arcuate supporting bar 10, and are provided at their lower faces with depending guides 37 and 38, consisting of rectangular loops through which the arcuate supporting bar 10 passes. The rear end of the beam is provided with a longitudinal slot 39 in which operates a depending anti-friction roller 40, mounted on an adjustable pivot 41, which extends downwardly from a transverse support or hanger 42, extending across the space between the handle bars and having upturned terminal portions, which are secured to the inner faces of the said handle bars. The transverse hanger or support 42 is provided at intervals with perforations 43 for the reception of the pivot 41 upon which the anti-friction roller 40 is mounted.

The handles are adjustable laterally through their pivotal connection with the main frame and when adjusted they shift the pivotal beam, which is then arranged in angular position with relation to the line of draft. The draft on the beam causes the latter to aline itself with the direction of travel of the draft animal, and as the handles are locked to the frame by the means hereinafter described, the roller 1 is caused to assume an angular position with relation to the line of draft, and as it rolls forward it will advance toward or from a row of plants, according to the adjustment of the beam. By this adjustment the roller 1 may be caused to climb a ridge and to approach the plants or hills at either side of a furrow, while the horse is traveling in the middle of the same. This enables the operator to change the direction of movement of the roller 1 without changing the direction of the travel of the draft animal, and the entire bed may be thoroughly operated on and the roller 1 caused to follow circular or uneven rows.

The handles are locked in their adjustment by means of a sliding spring actuated bolt 44, mounted in a bore or opening of an enlargement 45 of the rear portion of the guide 37 and controlled by a latch lever 46, pivotally mounted beneath one of the handle bars adjacent to the grip portion thereof and connected with the spring actuated bolt by a rod 47. The spring actuated bolt has a front engaging portion or tube, adapted to interlock with the recess formed by an arcuate series of teeth 48, located at the rear edge of the handle supporting bar 10. The locking mechanism for securing the handles in their adjustment is adapted to relieve the operator of the strain of holding the handles while guiding the land roller.

Having thus fully described my invention, what I claim as new and desire to secure by Letters Patent, is:—

1. A land roller comprising a frame, a roller mounted therein, a draft beam pivotally connected with the frame, and adjustable handles connected with the frame and with the pivoted beam.

2. A land roller comprising a frame, a roller mounted therein, a draft beam pivotally connected with the frame, and adjustable handles pivoted to the frame and connected with the beam.

3. A land roller comprising a frame, a roller mounted therein, a draft beam pivotally connected with the frame, adjustable handles connected with the frame and with the pivoted beam, and means for locking the handles to the frame to secure the same and the pivoted beam in their adjustment.

4. A land roller comprising a frame, a roller mounted in the frame, a draft beam pivoted at an intermediate point to the frame, and adjustable handles mounted on the frame and connected with the rear portion of the beam.

5. A land roller comprising a frame, a roller mounted in the frame, a draft beam pivoted at an intermediate point to the frame, and adjustable handles pivoted to the frame in advance of the pivot of the beam and connected with the latter in rear of the pivot thereof.

6. A land roller comprising a frame, a roller mounted in the frame, a draft beam pivoted at an intermediate point to the frame, adjustable handles pivoted to the frame in advance of the pivot of the beam and connected with the latter in rear of the pivot thereof, and locking mechanism for securing the handles and the beam in their adjustment.

7. A land roller comprising a frame, a roller mounted in the frame, a draft beam pivoted at an intermediate point to the frame, adjustable handles pivoted to the frame in advance of the pivot of the beam and connected with the latter in rear of the pivot thereof, and a locking device mounted on one of the handles and engaging the frame to secure both the handles and the beam in their adjustment.

8. A land roller comprising a frame provided with a transversely disposed arcuate supporting portion, a roller mounted in the frame, a longitudinal draft beam pivoted to the frame, and handle bars also pivoted to the frame and connected with the draft beam and supported by and shiftable laterally along the said arcuate portion.

9. A land roller comprising a frame provided with a transversely disposed toothed arcuate supporting portion, a roller mounted in the frame, a longitudinal draft beam pivoted to the frame, handle bars also pivoted to the frame and connected with the draft beam and supported by and shiftable laterally along the said arcuate portion, and a locking device carried by the handles and engaging with the toothed arcuate portion for securing the handles and the beam in their adjustment.

10. A land roller comprising a frame provided with a transversely disposed arcuate supporting portion, a roller mounted in the frame, a draft beam pivotally connected with the frame, and handles pivoted to the frame concentric with the arcuate supporting portion thereof and provided with guides embracing the said arcuate portion, said handles being also connected with and adapted to adjust the beam with relation to the frame.

11. A land roller comprising a frame having a rear arcuate supporting portion, a roller mounted in the frame, a draft beam pivoted at an intermediate point to the frame, handles also pivoted to the frame and supported by the said arcuate portion, and means including an anti-friction device for connecting the handles with the draft beam.

12. A land roller comprising a frame, a roller mounted in the frame, a longitudinal draft beam pivoted to the frame and provided at its rear portion with a slot, and handles also pivoted to the frame and provided with an anti-friction device operating in the slot of the draft beam.

13. A land roller comprising a frame, a roller mounted in the frame, a longitudinal draft beam pivoted to the frame and provided at its rear portion with a slot, and handles also pivoted to the frame and provided with an anti-friction device operating in the slot of the draft beam, said anti-friction device being adjustable with respect to the handles to change the position thereof with relation to the beam.

14. A land roller comprising a frame, a roller mounted in the frame, a longitudinal draft beam pivoted to the frame and provided with a slot, handles also pivoted to the frame, a transverse hanger connecting the handles, and an anti-friction device operating in the slot and adjustably mounted on the hanger.

15. A land roller comprising a frame, a roller mounted in the frame, a longitudinal draft beam pivoted at an intermediate point to the frame and provided at its front arm with a clevis, and handles pivotally mounted on the frame and connected with the rear arm of the draft beam for adjusting the latter.

16. A land roller comprising a frame having a front arcuate portion, a roller mounted in the frame, a longitudinal draft beam pivoted at an intermediate point to the frame and extending beneath and supporting the front arcuate portion of the frame, and pivoted handles mounted on the frame and connected with the rear arm of the draft beam.

17. A land roller comprising a frame having a front arcuate portion, a roller mounted in the frame, a draft beam pivoted at an intermediate point to the frame and having its front arm extending beneath the arcuate portion of the same and provided with an anti-friction device, which supports the said arcuate portion, said draft beam being also provided at its front arm with a clevis, and adjustable handles mounted on the frame and connected with the rear arm of the draft beam.

18. A land roller comprising a frame having front and rear arcuate portions, a roller mounted in the frame, a draft beam pivoted at an intermediate portion to the frame and extending beneath the front arcuate portions and supporting the same and provided at its front arm with a clevis, and handles pivotally mounted on the frame and supported by the rear arcuate portion thereof and connected with the rear portion of the draft beam.

19. A land roller comprising a frame having front and rear arcuate portions, a roller mounted in the frame, a draft beam pivoted at an intermediate portion to the frame and extending beneath the front arcuate portion and supporting the same and provided at its front arm with a clevis, and handles pivotally connected with the frame at the front arcuate portion thereof and supported by the rear arcuate portion of the same and connected with the draft beam.

20. A land roller comprising a frame, a roller mounted in the frame, a longitudinal draft beam pivoted at an intermediate point to the frame and provided at its front with a clevis, a bearing mounted on the front of the frame at the center thereof, and adjustable handles provided at their front ends with a pivot mounted in the bearing at the front of the frame, said handles being also connected with the rear arm of the draft beam.

21. A land roller comprising a frame provided with front and rear arcuate portions and having an intermediate connecting portion, a longitudinal draft beam pivoted to the intermediate connecting portion of the frame and extending beneath the front arcuate portion of the frame and supporting the same, and adjustable handles pivotally mounted on the front arcuate portion of the frame and supported by the rear arcuate portion thereof and connected with the draft beam.

22. A land roller comprising a frame including a front arcuate portion, an intermediate supporting portion located above the plane of the front arcuate portion, and a rear arcuate portion located above the plane of the intermediate supporting portion, a roller mounted in the frame, a draft beam pivoted between its ends to the intermediate supporting portion of the frame and extending upwardly to the rear supporting portion and downwardly beneath the front supporting portion, and handles pivoted to the front arcuate portion and supported by the rear arcuate portion and connected with the rear portion of the draft beam.

23. A land roller including a frame comprising approximately T-shaped side members forming forwardly, upwardly and downwardly extending arms, a front bar connecting the forwardly extending arms, an intermediate supporting bar mounted on the upwardly extending arms, and a rear supporting bar also carried by the upwardly extending arms of the side members, a roller mounted in the bearings of the side members, a draft bar pivoted to the intermediate supporting bar of the frame and extending beneath and supporting the front bar, and pivoted handles supported by the rear bar of the frame and connected with the draft beam.

24. A land roller including a frame comprising side members, front, intermediate and rear bars connecting the side members, the intermediate bar being provided with a central slot and having a removable plate or member forming the top wall thereof, a roller mounted in the frame, a longitudinal draft beam pivoted between its ends in the slot of the intermediate bar, and handles mounted on the front bar and supported by the rear bar and connected with the draft beam.

25. A land roller including a main frame comprising side members having forwardly and upwardly projecting arms provided with laterally extending lugs, the lugs being located at points intermediate of the ends of the arms, a front bar secured to the front lugs and abutting against the forwardly extending arms, an intermediate supporting bar mounted on the lugs of the upwardly extending arms, a rear bar provided with depending terminal portions secured to the upwardly extending arms above the lugs thereof, a draft beam pivoted to the intermediate bar, a roller mounted in the frame, and handles mounted on the frame and connected with the draft beam.

26. A land roller comprising a roller, a frame in which the roller is mounted, said frame including spaced sides, a front connecting bar extending in advance of the roller, a rear supporting bar located above the latter at the back thereof, and an intermediate supporting bar connected with the sides at the top roller and provided with a central bend extending forwardly over the roller, a draft beam pivoted between its ends to the intermediate supporting bar and extending downwardly beneath and supporting the front bar of the frame and having a clevis, and handles pivotally connected to the front of the frame and slidably connected with the rear supporting bar, said handles being also connected with the draft beam for shifting the same.

In testimony, that I claim the foregoing as my own, I have hereto affixed my signature in the presence of two witnesses.

DENNIS F. WILLIAMS.

Witnesses:
T. W. CROSSUO,
G. COSBY.